United States Patent

Young

[15] 3,662,636

[45] May 16, 1972

[54] MATERIAL CUTTER CONTROL APPARATUS

[72] Inventor: Dorse James Young, Centerville, Ohio

[73] Assignee: Harris-Intertype Corporation, Cleveland, Ohio

[22] Filed: June 12, 1970

[21] Appl. No.: 45,702

[52] U.S. Cl. ..............................83/71, 83/278, 179/100.2 S

[51] Int. Cl. ....................B26d 1/08, B26d 5/36, G11b 31/00

[58] Field of Search........340/174.1 K; 179/100.2 S, 100.2 B, 179/100.2 R; 83/71, 278; 214/1.6

[56] References Cited

UNITED STATES PATENTS

| | | | |
|---|---|---|---|
| 3,192,808 | 7/1965 | Fielder et al. | 83/71 |
| 3,174,370 | 3/1965 | Thumim | 83/71 |
| 3,194,094 | 7/1965 | Blaha | 83/71 |
| 3,118,334 | 1/1964 | Blaha | 83/71 |
| 3,176,556 | 4/1965 | Roberts et al. | 83/71 |

*Primary Examiner*—Bernard Konick
*Assistant Examiner*—Alfred H. Eddleman
*Attorney*—Marechal, Biebel, French & Bugg

[57] ABSTRACT

A material cutting apparatus includes a modular, replaceable control assembly for positioning a movable machine element, such as a backgauge, on the material cutter by controlling the element drive means. The control assembly includes a continuous magnetic tape which moves in response to the movement of the machine element past magnetic recording and/or playback heads. The magnetic tape is contained within a housing and supported for movement therein on a pair of rollers. The housing also contains recording and/or playback heads and means for indexing these heads relative to the tape to define a plurality of job programs on the tape. The housing is removably attached to the machine, preferably within easy access of the operator, and a mechanical connection is made by a chain between the magnetic tape and the machine element for moving the tape through a distance proportional to the movement of the machine element. An electrical connection is also made between the magnetic heads and the drive means for controlling the movement of the machine element in accordance with control signals on the magnetic tape.

4 Claims, 3 Drawing Figures

INVENTOR
D. JAMES YOUNG
BY
Marechal, Biebel, French & Bugg
ATTORNEYS

MATERIAL CUTTER CONTROL APPARATUS

RELATED APPLICATIONS

Reference is hereby made to my copending applications Ser. No. 1,407, filed Jan. 8, 1970; and Ser. No. 1,506, filed Jan. 8, 1970, both assigned to the same assignee as the present invention.

BACKGROUND OF THE INVENTION

In material cutting devices, such as shown in U.S. Pat. Nos. 3,118,334 and 3,176,556, a backgauge is driven by a lead screw to position a stack of material beneath the knife. The position of the backgauge may be controlled either manually or automatically by a control record, e.g., tape or drum, moving relative to magnetic sensing heads in response to movement of the backgauge. In the material cutting devices of the type disclosed in the above mentioned patents, the control record may contain a plurality of channels with each channel containing control marks for a particular job program.

In the most commonly used paper cutters, a drum control record is used, such as shown in FIG. 12 of U.S. Pat. No. 3,118,334, with the drum being rotated to select various job programs. The drum is coated with a magnetic material, and magnetic marks are recorded on the drum and sensed by heads which move with the backgauge. Thus, as the backgauge is moved forward and a control mark is sensed, the backgauge will stop at a predetermined location and cutting of the material may then take place.

In the event of damage to the drum or in the event that a job program is required which is not found on the drum, and it is desired that the job programs on the drum in use not be altered, then it becomes necessary to replace the drum. These drums are easily damaged, and are difficult to store for long periods of time.

SUMMARY OF THE INVENTION

This invention relates to a novel control assembly for positioning a machine element, such as a backgauge of a material cutting device, and includes in a modular, replaceable housing containing both a magnetic tape control record and associated magnetic recording and/or playback heads. A single mechanical connection to the machine element is needed for moving the control record through a distance proportional to the movement of the machine element, and a single electrical connection to the magnetic recording and/or playback heads is made to control the movement of the machine element in accordance with control signals recorded on the magnetic tape.

The modular, replaceable control assembly used in this invention is preferably placed in a protected location, usually below the material supporting table, and is accessible to the machine operator so that replacement of the entire assembly may be made quickly, when necessary. Inexpensive magnetic tape is contained in a housing which protects the tape, and the marks recorded thereon, from damage. Thus, if replacement is ever needed and/or a new or different job program required, installation of a substitute or replacement control assembly may be made quickly.

By including the magnetic control record and the magnetic recording and/or playback heads in a single housing, which is then installed as a unit on the machine, the relationship of the tape to the magnetic heads is maintained independent of the alignment of the housing relative to the machine. The tension on the tape is also independent of this alignment. The mechanical connection between the control record and the machine element in the preferred embodiment is by a precision chain which interconnects the magnetic tape with the lead screw of the machine. Since a chain is used, precise and accurate alignment of the housing on the machine is not required although the tape will accurately follow the movement of the machine element. The tension on the chain is controlled by spring means within the housing to minimize backlash.

The replaceable control assembly, including both the magnetic tape and the magnetic heads, may therefore be replaced as a unit quickly, and as a result, down time on the machine when this unit is changed is substantially less than replacement of the control elements on previous machines of the same type. Once removed, the tape may be replaced or the entire assembly repaired at the operator's convenience.

Accordingly, it is an object of this invention to provide an improved control assembly for controlling the position of a movable element of a machine by controlling the drive means of the machine wherein the control assembly is a modular, replaceable unit containing both magnetic control record and magnetic recording and/or sensing heads in a housing removably mounted on the machine and connected to the machine by simple mechanical and electrical means.

It is another object of this invention to provide an improved control assembly of the type described wherein the alignment between the magnetic tape and the magnetic recording and/or playback heads in a housing is maintained independent of the alignment of housing with the machine element.

It is another object of this invention to provide an improved control assembly of the type described wherein a magnetic tape is supported for movement relative to magnetic recording and/or playback heads within a housing and wherein the magnetic tape is mechanically connected to the movable machine element by a chain, thereby reducing the need for accurate mounting of the housing relative to the machine.

Other objects and advantages of the invention will be apparent from the following description, the accompanying drawings and the appended claims.

DESCRIPTION OF THE PREFERRED EMBODIMENT

Figures 1, 2, 3:
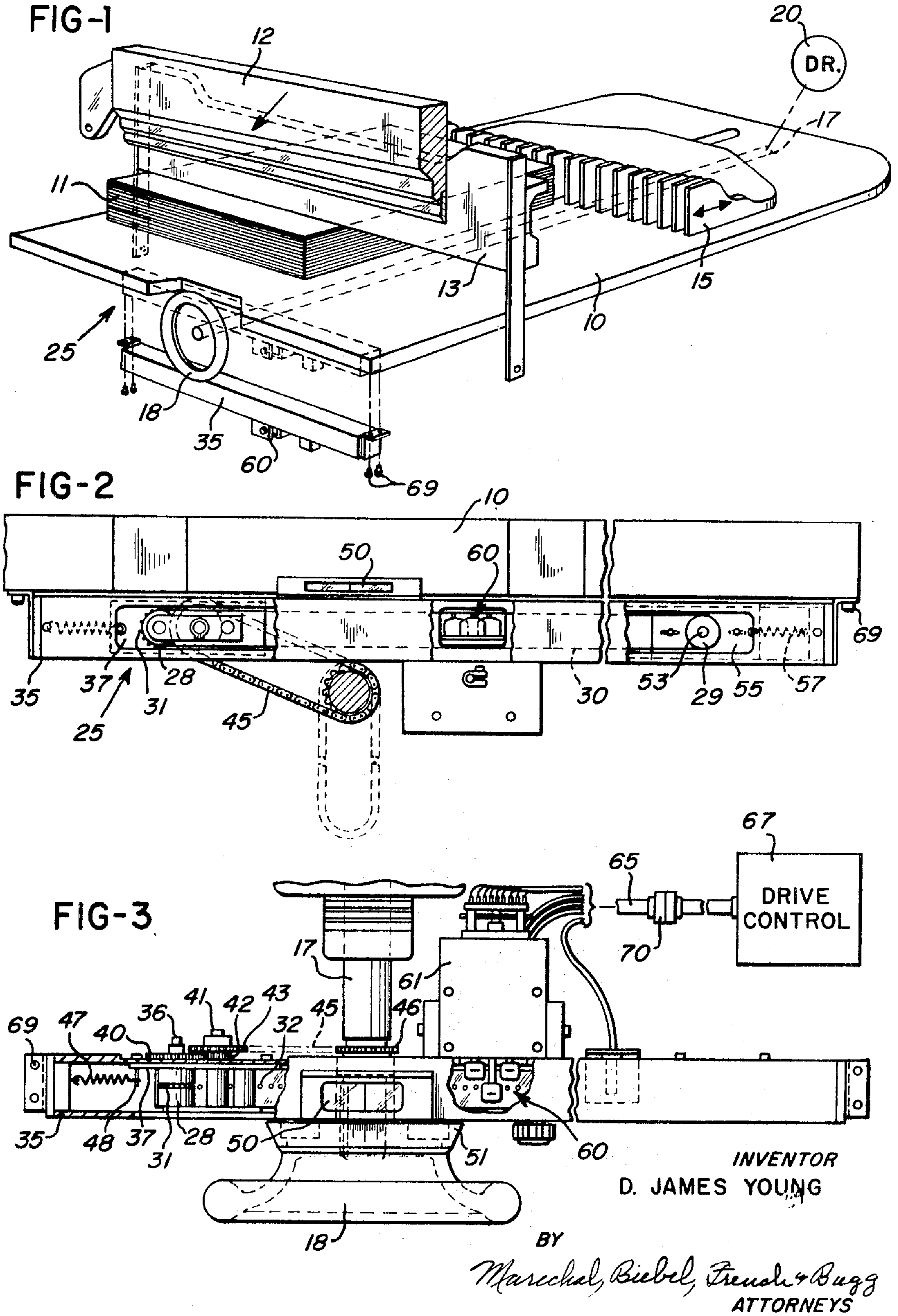
FIG. 1 is a perspective view of a material cutting device including the modular, replaceable control assembly of this invention, the control assembly being shown removed from the machine.
FIG. 2 is a front elevational view of the control assembly and its relationship to the lead screw and table of the machine.
FIG. 3 is a plan view of the control assembly showing its relation to a portion of the machine including the lead screw and hand wheel assembly.

Referring now to the drawings, a material cutting apparatus is shown generally in FIG. 1 and includes a table 10 upon which is placed a stack of material 11, such as paper, to be cut by a knife 12. A clamp 13 holds the material during cutting while a backgauge 15 positions the material beneath the knife. The backgauge 15 is moved by a lead screw 17 rotatably supported beneath the table 10. A hand wheel 18 is attached to one end of the lead screw and permits the machine operator to position the backgauge manually. Drive means 20 is attached to the other end of the lead screw 17 and positions the backgauge 15 automatically under the direction of a control assembly, shown generally at 25. For a more complete description of the operation of the material cutting device, reference is made to the above mentioned copending application Ser. No. 1,407.

The control assembly 25 is a modular, replaceable unit preferably mounted in a protected location within easy access of the operator. This has been found to be under the table 10 at the front of the machine, as shown in dashed lines in FIG. 1, where the operator can remove and replace the control assembly when it becomes necessary to do so.

The control assembly 25, is shown in FIGS. 2 and 3, includes a sprocket wheel 28 and a roller 29 over which is reeved a continuous magnetic control record or tape 30. Sprocket wheel 28 has formed thereon a plurality of sprocket pins 31 which engage sprocket holes 32 positioned centrally of the tape 30 to provide positive and accurate control over the movement and position of the tape. The magnetic tape and the sprocket wheels and roller are contained within a housing 35 which protects the tape 30 and the other components of the control assembly from dust and/or accidental damage.

Sprocket wheel 28 rotates about a shaft 36 which is journaled in a carriage 37 slidably mounted within the housing 35. A gear 40 is mounted to the shaft 36 and rotates in unison with the sprocket wheel 28. Also journaled in the carriage 37 is a shaft 41 on which is carried a gear 42 which meshes with gear 40. The shaft 41 also carries a sprocket 43.

Means for mechanically connecting the control record or magnetic tape to the movable machine element or backgauge includes a chain 45 which is removably connected to sprocket 43 and a sprocket 46 mounted to rotate with the lead screw 17. Tension is maintained on the chain 45 by spring 47 secured at one end to the housing 35 and at its other end to a pin 48 attached to the carriage 37. Thus, the tension on the chain 45 is maintained by the spring 47 to eliminate backlash and cause the magnetic tape 30 to move through a distance proportional to the movement of the lead screw 17 and the backgauge 15.

The gear ratio between sprockets 43 and 46, and the gears 40 and 42 are so selected that the magnetic tape 30 moves through the same distance as the backgauge 15. In the preferred embodiment, the magnetic tape 30 carries on it visible indicia and since it moves through the same distance as the backgauge 15, the operator may refer to this visible indicia when positioning the backgauge manually by rotating the hand wheel 18. The indicia may be viewed through opening 50 in the housing 35 located adjacent a circular scale 51 mounted to rotate with the lead screw 17. A more complete description of this feature may be found in the above mentioned application Ser. No. 1,506.

The other end of the magnetic tape is supported by a roller 29 rotatably mounted on shaft 53 journaled within carriage 55. The tape is held in tension against the roller 29 and the sprocket wheel 28 by spring 57, one end of which is connected to carriage 55, and the other end is connected to housing 35. The spring 47 is stronger (i.e., has a larger spring constant) than spring 57 so that the chain 45 will be held in tension by spring 47 while the tape 30 is, at the same time, held in tension against the sprocket wheel 28 and roller 29.

The control assembly 25 also includes magnetic recording and/or playback heads which place and/or sense control signals on the tape 30. As previously stated, these control signals control the positioning of the backgauge 15. The magnetic recording and/or playback heads are in a sensing head assembly 60, and comprise three heads two of which are aligned with the direction of relative movement between the tape and the head so that they may scan the same marks on the tape. These two aligned heads scan tracks located on one half of the tape, or from one edge of the tape to the sprocket holes 32. The third head is mounted so that it scans the other half of the tape. All three heads are mounted on an assembly controlled by an indexing mechanism 61 which moves the heads simultaneously across the tape through predetermined distances in a direction substantially perpendicular or transverse to the direction of relative movement between the tape and the sensing heads to position the heads and therefore to define a plurality of channels or tracks on the tape in which different job programs may be recorded.

The magnetic recording and/or playback heads are connected by means of an electrical cable 65 to a control circuit 67 which in turn regulates the drive means 20 and properly positions the backgauge in accordance with the control marks recorded on the tape 30.

As shown in FIGS. 1–3, the control assembly 25 is removably attached to the bottom side of the table 10 by means of four screws 69, and the mechanical connection between the control record and the machine is made by the chain 45. An electrical connection through cable 65 and connector 70 is made to the electrical controls of the machine.

As will be apparent to those skilled in the art, the alignment between the magnetic recording and/or playback heads and the magnetic tape is independent of the alignment of the control assembly 25 relative to the machine since the heads and the tape are contained in the removable housing 35. Alignment of the control assembly with the machine is not critical since a flexible mechanical connection through chain 45 is provided. Also, only simple mechanical and electrical connections exist between the control assembly and the machine thus facilitating easy removal and replacement of the control assembly when this becomes necessary.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a cutting machine having a horizontal table, a knife mounted for vertical cutting movement relative to material lying on said table, a backgauge for pushing material along said table toward said knife in predetermined accurate increments, drive means for said backgauge, and control means for said drive means, said control means comprising a modular, replaceable control assembly including:

a magnetic tape;

magnetic recording and/or playback heads for placing and/or sensing control signals on said tape, which signals correspond to said predetermined increments of backgauge movement;

an enclosed housing for containing said tape and said heads;

means for accurately supporting said tape within said housing for linear movement past said heads;

means for indexing said heads through predetermined distances in a direction transverse to the direction of tape movement to define a plurality of different channels on said tape, each of which channels contains control signals for positioning said backgauge in different predetermined increments;

a drive element for said tape within said housing, said element comprising a driven portion of the exterior of said housing;

an electrical releasable coupling at the exterior of said housing, one portion of which is electrically connected to said heads and the other portion of which is electrically connected to the drive means for said backgauge;

means for releasably mechanically connecting said backgauge drive means with said driven portion of said element; and means for removably mounting said entire control assembly on said cutting machine with the only operative connections being by means at said electrical coupling and said mechanical connection.

2. In a cutting machine according to claim 1, wherein said mechanical connection means comprises a continuous precision chain and wherein said driven portion of said element and the portion of said drive means to which said mechanical connection is coupled comprises driven and driving sprockets respectively, and means for tensioning said chain to provide direct accurate response between said driving and driven sprockets whereby said tape and said backgauge drive means are maintained in accurate relationship.

3. In a cutting machine according to claim 2, wherein said driven sprocket is slidable relative to said housing, and wherein said chain tensioning means is carried by said housing and acts on said driven sprocket to move it in a tensioning direction wherever said control assembly is mounted in operative position on said cutting machine.

4. In a cutting machine according to claim 3, wherein said tape forms a continuous loop having a tape-driving sprocket at one end of the loop and mechanically connected to said driven sprocket, an idler sprocket at the opposite end of said tape loop, and a tensioning spring urging said idler sprocket in opposition to said tape-driving sprocket to maintain tension in said tape which is independent of chain tension.

* * * * *